Dec. 27, 1960  E. J. MARTIN  2,966,241
BRAKE STRUCTURE HAVING HEAT ABSORPTION AND DISSIPATING MEANS
Filed March 22, 1955  3 Sheets-Sheet 1

INVENTOR.
Edward J. Martin
BY Craig V. Monton
His Attorney

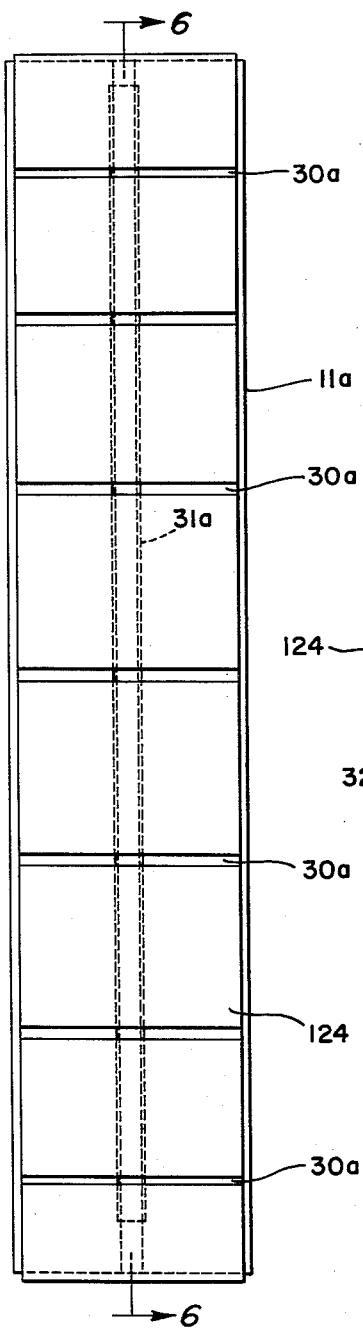
Fig. 5
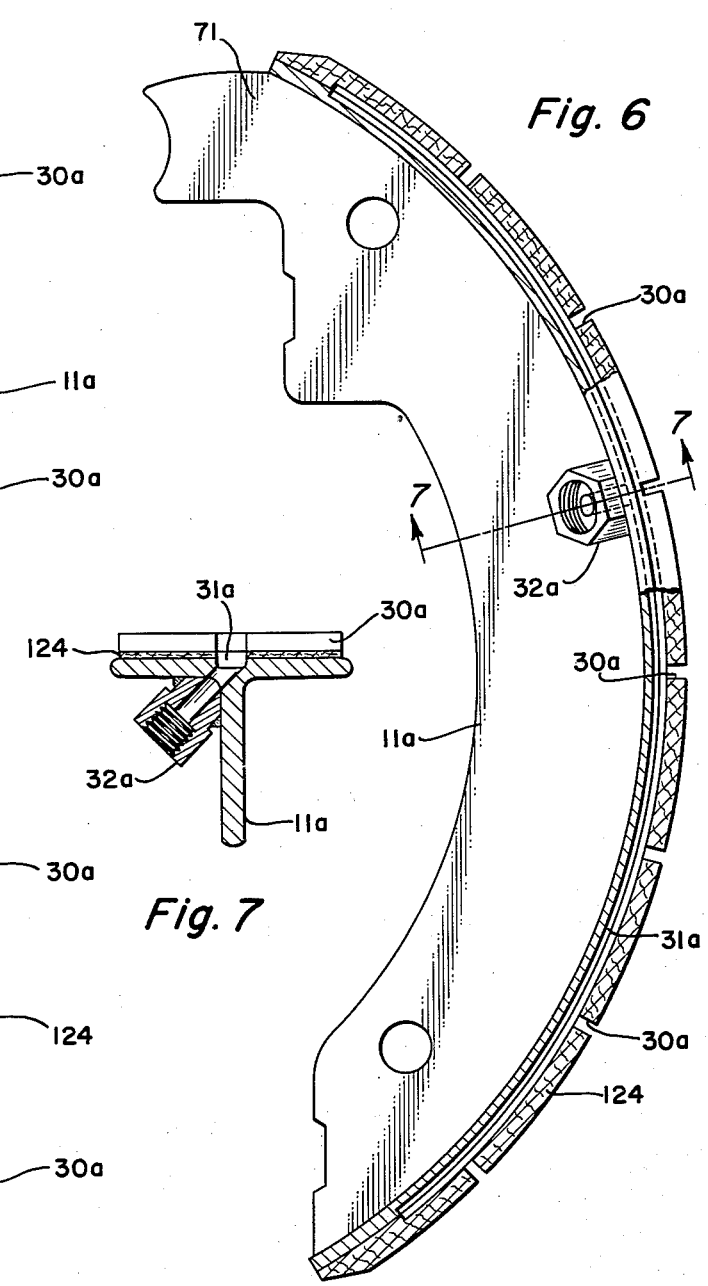
Fig. 6
Fig. 7
INVENTOR.
Edward J. Martin
BY
Craig V. Morton
His Attorney Dec. 27, 1960     E. J. MARTIN     2,966,241
BRAKE STRUCTURE HAVING HEAT ABSORPTION AND DISSIPATING MEANS
Filed March 22, 1955     3 Sheets-Sheet 3

INVENTOR.
Edward J. Martin
BY
His Attorney

United States Patent Office 2,966,241
Patented Dec. 27, 1960

1

2,966,241

BRAKE STRUCTURE HAVING HEAT ABSORPTION AND DISSIPATING MEANS

Edward J. Martin, Pleasant Ridge, Mich., assignor to General Motors Corporation, Detroit, Mich., a corporation of Delaware Filed Mar. 22, 1955, Ser. No. 496,018

3 Claims. (Cl. 188—264)

This invention relates to a friction brake.

An object of the invention is to provide a friction brake structure incorporating means for absorbing friction created heat from the rotatable member of the brake and for dissipating friction created heat substantially concurrently.

Another object of the invention is to provide a friction brake structure incorporating means for effecting movement of a gaseous fluid medium between the friction surface and the rotatable member of the brake in thermal exchange relationship with the rotatable member to remove heat from the rotatable member and carry the heat away from the rotatable member by the flow of the gaseous fluid medium.

Another object of the invention is to provide a friction brake structure to accomplish the result of the foregoing object wherein a plurality of grooves are provided in the friction surface of a friction member to form closed passages when the friction surface is in engagement with the rotatable member of the brake structure for conduction of a gaseous fluid medium in heat exchange relationship with the rotatable member to absorb heat therefrom and conduct the heat away from the rotatable member.

Still another object of the invention is to provide a brake structure accomplishing the result of the aforementioned objects wherein the friction lining of a friction member is provided with a plurality of open ended grooves extending transversely of the lining and interconnected with a feeder groove through which a gaseous fluid medium is circulated when the friction lining engages the rotatable member of the brake structure for dissipation of heat from the rotatable member.

Another object of the invention is to provide a friction brake structure that incorporates a heat absorbing mass adapted for engagement with the rotatable member substantially concurrently with engagement of the rotatable member by the friction element of the brake to remove heat from the rotatable member and store the removed heat in the heat absorption mass and also concurrently provide for dissipation of heat from the rotatable member by circulating a gaseous fluid medium between the friction member and the rotatable member of the brake structure.

Further objects and advantages of the present invention will be apparent from the following description, reference being had to the accompanying drawings wherein a preferred form of the invention is clearly shown.

In the drawings:

Figure 5 is an elevational face view of a brake shoe

2 having slots in the friction surface to provide for circulation of the gaseous fluid medium therein.

Figure 6 is a vertical cross sectional view taken along line 6—6 of Figure 5.

Figure 7 is a transverse cross sectional view taken along line 7—7 of Figure 6.

Figure 8:
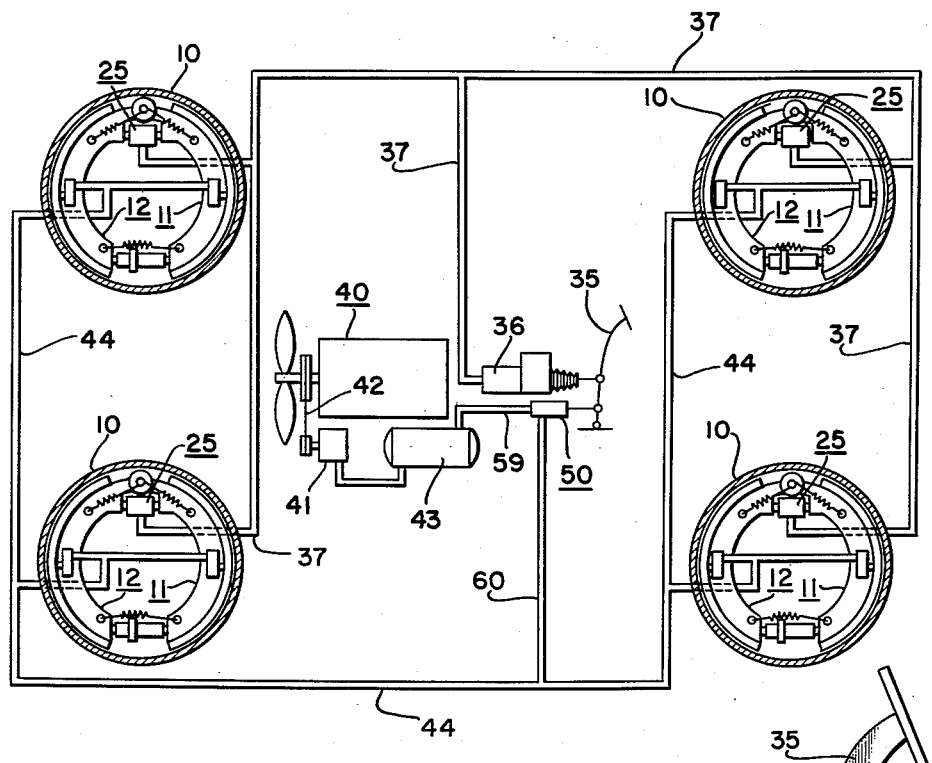

Figure 8 is a schematic system view of a brake system incorporating features of this invention.

Figure 9:
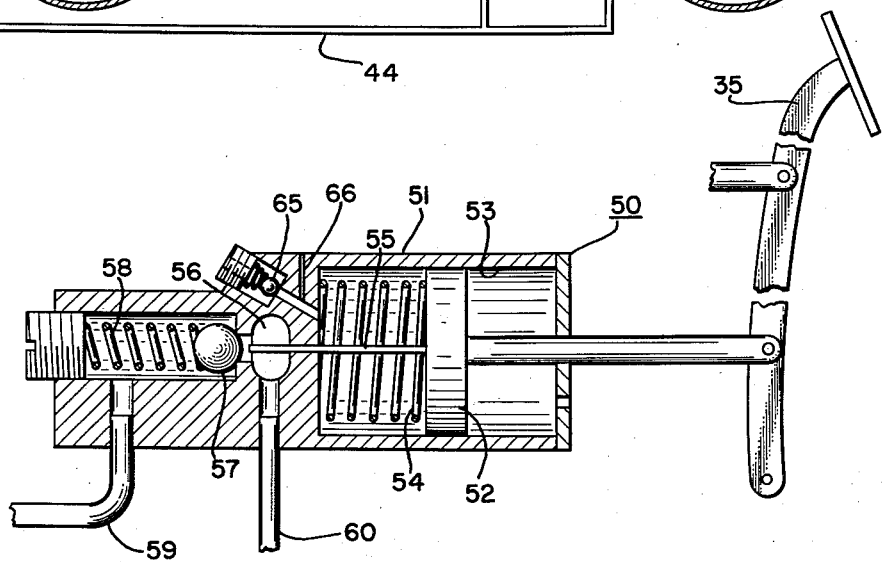

Figure 9 is a cross sectional view of a control valve for regulating the flow of gaseous fluid pressure medium to the brakes for cooling.

In this invention the brake structure comprises a brake drum 10 that is supported on a wheel of a vehicle in any conventional manner. The direction of rotation of the drum is as indicated by the arrow on Figure 1.

A pair of brake shoes 11 and 12 are disposed within the brake drum 10. The brake shoes 11 and 12 are identical in construction so that the same reference numerals are applied to the several elements of the brake shoes.

Each of the brake shoes 11 and 12 consist of an arcuate member 13 that has a web 14 secured thereto radially of the arcuate member 13. The arcuate members 13 carry the friction lining member 24 for engagement with the brake drum 10 in conventional manner. Adjacent cooperating ends 15 of the brake shoes 11 and 12 engage an anchor pin 16. The ends 15 of the brake shoes are retained against the anchor pin 16 by mean of retraction springs 17.

The opposite adjacent ends 18 of the brake shoes 11 and 12 engage an adjusting device 20 that is extensible for brake shoe adjustment upon rotation of the star wheel 19. A tension spring 21 retains the ends 18 of the brake shoes in engagement with the adjusting device 20.

A hydraulically operated brake actuating device 25 is disposed between the brake shoes 11 and 12. The actuating device 25 has plunger members 26 extending therefrom to engage the webs 14 of the brake shoes to urge the brake shoes into engagement with the brake drum 10.

Figure 1:
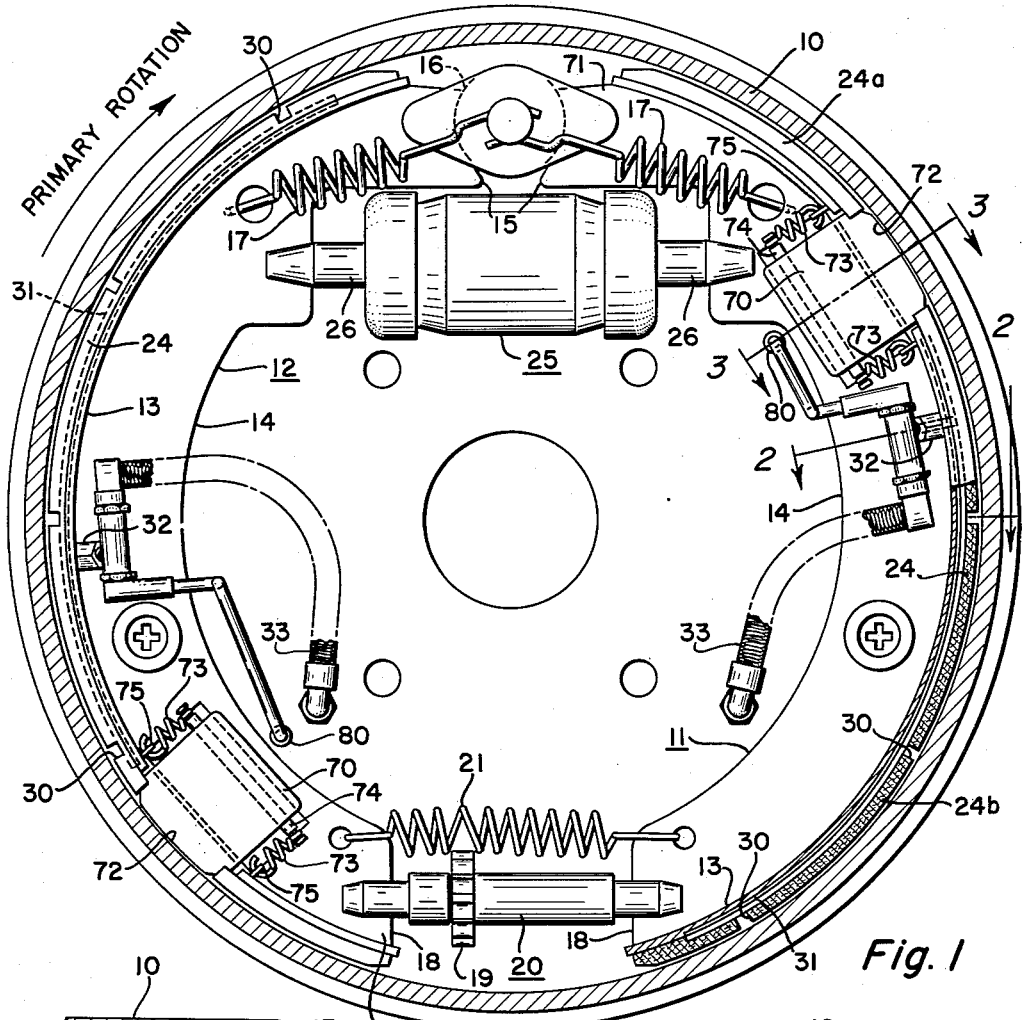
Figure 1 is a vertical cross sectional view of a brake structure incorporating features of this invention.

The brake illustrated in Figure 1 is of the Duo-Servo type in which movement of the brake shoe 11 into engagement with the drum 10 effects clockwise rotation of the brake shoes to hold the end 15 of the brake shoe 12 against the anchor pin 16 during operation of the brake.

Figure 2:
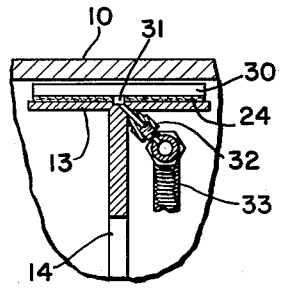
Figure 2 is a cross sectional view taken along line 2—2 of Figure 1.

To provide for cooling of the brake drum 10, and to reduce peak temperature of the brake lining elements 24, each of the friction members or lining elements 24 are provided with a plurality of grooves 30 that extend transversely of the brake shoes 11 and 12. The grooves 30 are disposed in parallel relation and extend from side to side of the friction member 24, as shown in Figure 2. Thus the grooves 30 have open ends through which a gaseous fluid medium can be expelled. The transversely extending grooves 30 are interconnected by a longitudinally extending feeder groove 31 that extends into the friction member 24 from the rear face thereof so as to provide a conducting groove for supplying a gaseous fluid pressure medium to the several transversely extending grooves 30. A suitable connection means 32 is attached to the shoe for conducting fluid gaseous medium to the feeder groove 31. A flexible conduit 33 provides for connection with a feeding system to supply gaseous fluid pressure medium to the cooling grooves 30 in a manner hereinafter described.

In Figure 8 there is illustrated schematically a brake system to provide hydraulic actuation of the brakes and to provide for supply of a gaseous fluid pressure medium to the brakes for cooling action. In this system the brake pedal 35 actuates a conventional hydraulic master cylinder 36 that supplies hydraulic fluid under pressure to the system lines 37 for actuation of the hydraulically actuated actuating devices 25 to effect operation of the brakes in conventional manner.

To supply a gaseous fluid medium under pressure to the brakes for cooling of the brake drum 10 and the friction members 24 of the brake shoes, the engine 40 of the vehicle is adapted to drive an air compressor 41 through the medium of a belt 42 to supply air under pressure to a reservoir 43. The reservoir 43 is connected to the system supply lines 44 through which air under pressure is supplied to the conduits 33 of the several brakes for delivering air under pressure into the several feeder grooves 31 of the respective brake shoes for discharge through transversely extending grooves 30 in the friction members 24. The compressed air supplied to the lines 44 is maintained under control of a valve 50, more particularly illustrated in Fig. 9, and operated by the brake pedal 35 concurrently with operation of the master cylinder 36 so as to effect a flow of air under pressure into the lines 44 concurrently with operation of the master cylinder 36.

The control valve 50 illustrated in Fig. 9 comprises a body 51 having a piston 52 therein slidable in the bore 53 and spring urged in a rightward direction by the spring 54. A pin projection 55 extends forwardly into the chamber 56 to unseat a ball valve 57 when the piston 52 moves in a leftward direction. The ball valve 57 is spring urged on its seat by the spring 58 to normally maintain closed communication between the air inlet line 59 from the reservoir 43 and the air outlet line 60 to the lines 44 of the air supply system.

The valve 50 is constructed and arranged to provide for a delayed action return of the brake pedal 35 after a braking operation to delay the time of closing of the ball valve 57 and thereby continue a flow of air into the friction elements 24 for a delayed time period after the friction elements have been retracted from the brake drum 10 whereby the cooling action of the air stream over the brake drum can reduce the temperature of the brake drum during a non-braking period following a braking operation.

To effect the delay return of the brake pedal 35 and thus delayed closing of the valve 57 there is provided in the valve 50 a freely opening check valve 65 that opens on leftward movement of the piston 52 to exhaust the air from the left hand side of the piston. When the return spring for the brake pedal 35, or the spring 54 of the valve 50 urges the piston 52 in a right hand direction the valve 65 closes and a restricted orifice 66 allows air to move into the chamber on the left hand side of the piston 52 slowly thereby obtaining a dash-pot action for delayed closing of the valve 57.

Figure 3:
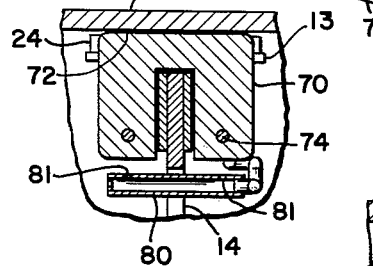
Figure 3 is a cross sectional view taken along line 3—3 of Figure 1.

In addition to the heat dissipating means heretofore described, to wit, the circulation of a gaseous fluid pressure medium between the friction element 24 and the brake drum 10, there is provided a heat absorbing mass 70 carried on each of the brake shoes 11 and 12 adjacent the leading ends 71 of the respective brake shoes. The heat absorbing mass 70 consists of a metal member, illustrated in cross section in Fig. 3, that extends through the arcuate portion 13 of the brake shoes and through the friction member 24 so that the outer periphery 72 of the mass 70 engages the brake drum 10 substantially concurrently with engagement of the friction element 24 with the drum. The mass 70 is retained in engagement with the brake drum 10 by means of the springs 73 extending between the pins 74 and the ears 75 on the shoe 11. Thus, the heat absorbing mass 70 removes heat from the brake drum 10 adjacent the leading edge of the brake shoe and stores the same within the heat absorbing mass to break the compounding of the heat of friction from the leading portion 24a of the friction element to the trailing portion 24b. The circulation of gaseous fluid medium through the trailing portion 24b effects a thermal exchange of heat from the brake drum to the circulating gaseous fluid medium with resultant dissipation of heat since the gaseous medium discharges through the open ended transversely extending grooves 30 and carries the absorbed heat from the brake drum.

In Figures 5, 6, and 7 there is illustrated a brake shoe 11a in which the transversely extending grooves 30a are provided from the leading end 71 to the trailing end of the brake shoe so as to effect heat dissipation from the brake drum over the entire surface of the friction member 124, the feeder groove 31a conducting a gaseous fluid pressure medium to the several grooves 30a as introduced thereto from the inlet 32a.

In Figure 1 there is also illustrated a means for dissipating heat from the heat absorbing mass 70 that includes a conduit member 80 connected with the gaseous fluid pressure inlet line 33, the conduit member 80 having discharge ports 81 that direct a flow of cooling air over the heat absorbing mass 70. Thus when the valve 50 effects a delayed closing of the air control valve 57 after a braking operation, the cooling air passing over the heat absorbing mass 70 during this delayed action will result in dissipation of heat from the heat absorbing mass to reduce its temperature quickly and render it effective for a subsequent braking action.

Figure 4:
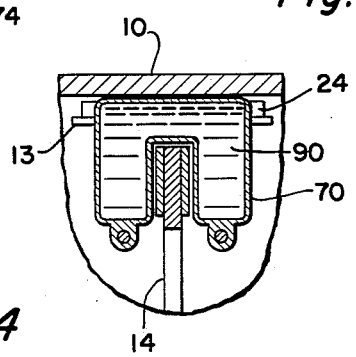
Figure 4 is a cross sectional view similar to Fig. 3 but showing a modified form of heat absorbing mass to remove heat from the rotatable member of the brake.

In Figure 4 there is illustrated a slightly modified arrangement of heat absorbing mass 70 wherein the heat absorbing member is hollow and contains a substance 90 that has a phase change on rising temperature. Suitable metals, organic compounds, or liquids or metal alloys can be selected to provide a phase change from solid to liquid or from liquid to gas at a desirable temperature sufficiently low as to provide for a rapid absorption of a substantial volume of heat from the brake drum. For example, sodium having a melting point of 97.5° C. or propylene chloride having phase change of 96.8° C. are suitable for use in the heat absorbing mass 70 to provide for substantial storage of heat as a result of the phase change of the substance, at least to the value of the latent heat of the substance.

While the form of embodiment of the invention as herein disclosed constitutes a preferred form, it is to be understood that other forms might be adopted as may come within the scope of the claims which follow.

What is claimed is as follows.

1. In a friction brake, the combination of, a rotatable member to be braked, a stationary brake shoe having a friction lining engageable with the rotatable member to brake the same, heat absorbing means carried on said brake shoe and replacing a segment of said brake shoe and a portion of said lining to engage the friction surface of the rotatable member, said means being disposed inwardly of the leading end of the lining as related to the direction of rotation of the rotatable member but adjacent thereto to effect removal of heat of friction from the rotatable member by heat absorption as created at said leading end, and other means to effect forced gaseous fluid heat removal from said heat absorbing means and from the shoe between the heat absorbing means and the trailing end of the shoe.

2. In a friction brake, the combination of, a rotatable member to be braked, a stationary brake shoe having a friction lining engageable with the rotatable member to brake the same, heat absorbing means resiliently carried on the brake shoe extending through the brake shoe and lining engageable with the friction surface of the rotatable member the full width of the brake shoe on engagement of the lining therewith, said means being disposed inwardly of the leading end of the lining as related to the direction of rotation of the rotatable member but adjacent thereto to effect removal of heat of friction from the rotatable member by heat absorption at said leading end, other means including first conduit means for conducting pressurized gaseous fluid for dissipation of heat from said heat absorbing means, second conduit means for conducting a pressurized gaseous fluid to said brake shoe, closed passage means extending longitudinally in said brake shoe in communication with said second conduit means, lateral grooves in said friction lining in communication with said passage means for conducting a pressurized fluid to effect additional forced heat removal from the rotatable member by heat dissipation to substantially the trailing end of the friction lining, and means maintaining said other means active for a predetermined time period after disengagement of the friction member from the rotatable member for continued heat dissipation.

3. In a friction brake, the combination of, a rotatable member to be braked, a stationary brake shoe having a friction lining engageable with the rotatable member to brake the same, heat absorbing means on the brake shoe extending through an opening formed by removal of an arcuate segment of the brake shoe and the lining and engageable with the friction surface of the rotatable member on engagement of the lining therewith, said means being disposed inwardly of the leading end of the lining as related to the direction of rotation of the rotatable member but adjacent thereto to effect removal of heat of friction from the rotatable member by heat absorption as created at said leading end, other means in the shoe between the first means and the trailing end of the shoe to effect additional forced gaseous fluid heat removal from the rotatable member by heat dissipation to substantially the trailing end of the friction lining said other means providing forced gaseous fluid heat removal from said heat absorbing means, and spring biased and air pressure controlled means controlling the heat dissipating means to render it effective for heat dissipation for a time period of greater duration than the engagement of the friction lining of said brake shoe with said rotatable member.

References Cited in the file of this patent

UNITED STATES PATENTS

| | | |
|---|---|---|
| 885,414 | Woods | Apr. 21, 1908 |
| 1,245,040 | Scaife | Oct. 30, 1917 |
| 1,842,102 | Knight | Jan. 19, 1932 |
| 1,844,461 | Chase | Feb. 9, 1932 |
| 1,923,872 | Loughead | Aug. 22, 1933 |
| 2,471,858 | Bloomfield | May 31, 1949 |
| 2,713,923 | Eksergian et al. | July 26, 1955 |
| 2,818,941 | Berno | Jan. 7, 1958 |
| 2,851,132 | James | Sept. 9, 1958 |

FOREIGN PATENTS

| | | |
|---|---|---|
| 154,836 | Australia | Jan. 20, 1954 |
| 807,511 | France | Oct. 19, 1936 |
| 991,425 | France | June 20, 1951 |
| 537,069 | Germany | Oct. 30, 1931 |
| 488,382 | Great Britain | July 6, 1938 |
| 645,484 | Great Britain | Nov. 1, 1950 |
| 701,725 | Great Britain | Dec. 20, 1953 |
| 355,699 | Italy | Jan. 14, 1938 |